US010846803B2

(12) United States Patent
Djabarov et al.

(10) Patent No.: US 10,846,803 B2
(45) Date of Patent: *Nov. 24, 2020

(54) PRESENTING PREVIOUSLY PRESENTED CONTENT ITEMS STORED BY USERS OF A SOCIAL NETWORKING SYSTEM

(71) Applicant: Facebook, Inc., Menlo Park, CA (US)

(72) Inventors: Gueorgui Nikolov Djabarov, Yorba Linda, CA (US); John Graham Keggi, San Francisco, CA (US); Daniel Joseph Giambalvo, Seattle, WA (US); Ash Wahi, Seattle, WA (US); Mao Xue, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,542

(22) Filed: Nov. 26, 2018

(65) Prior Publication Data

US 2019/0147550 A1    May 16, 2019

Related U.S. Application Data

(63) Continuation of application No. 14/590,290, filed on Jan. 6, 2015, now Pat. No. 10,140,669.

(51) Int. Cl.
  *G06F 16/30* (2019.01)
  *G06Q 50/00* (2012.01)
  *G06F 16/9535* (2019.01)

(52) U.S. Cl.
  CPC ......... *G06Q 50/01* (2013.01); *G06F 16/9535* (2019.01)

(58) Field of Classification Search
  CPC .......... G06F 17/30867; G06F 16/9535; G06Q 50/01
  (Continued)

(56) References Cited

U.S. PATENT DOCUMENTS

| 8,332,512 B1 | 12/2012 | Wu et al. |
| 2012/0159635 A1 | 6/2012 | He et al. |

(Continued)

FOREIGN PATENT DOCUMENTS

| JP | 2007-035054 A | 2/2007 |
| JP | 2010-521746 A | 6/2010 |
| KR | 101289638 B1 | 8/2012 |

OTHER PUBLICATIONS

Canadian Intellectual Property Office, Office Action, Canadian Patent Application No. 2,972,703, dated May 11, 2018, four pages.

(Continued)

*Primary Examiner* — Kuen S Lu

(74) *Attorney, Agent, or Firm* — Fenwick & West LLP

(57) ABSTRACT

A social networking system permits users to store content presented by the social networking system and subsequently access the stored content associated with the users. A content item is stored in association with a user profile of a user that stored the content item and with one or more rules specifying criteria causing presentation of the stored content item to the user when satisfied. Additionally, a rule associated with a stored content item may specify a format in which the stored content item is presented when criteria associated with the rule are satisfied. When characteristics associated with a user satisfy criteria associated with a rule associated with a stored content item, the stored content item is included in a selection process determining content that is presented to the user.

20 Claims, 3 Drawing Sheets

(58) Field of Classification Search
USPC .......................................................... 707/722
See application file for complete search history.

(56) References Cited

U.S. PATENT DOCUMENTS

| | | |
|---|---|---|
| 2012/0191844 A1 | 7/2012 | Boyns et al. |
| 2013/0013418 A1* | 1/2013 | Novikov ................ G06Q 30/02 705/14.66 |
| 2013/0227076 A1* | 8/2013 | Conley ................... H04L 21/00 709/219 |
| 2013/0263166 A1 | 10/2013 | Fleischman |
| 2014/0006423 A1 | 1/2014 | Melnychenko et al. |
| 2014/0208232 A1 | 7/2014 | Leibrock et al. |
| 2014/0229618 A1* | 8/2014 | Kumar ................ H04L 67/1044 709/225 |
| 2014/0244621 A1 | 8/2014 | Lindsay |
| 2015/0237472 A1* | 8/2015 | Alsina ................... H04W 4/021 455/456.3 |
| 2015/0261851 A1* | 9/2015 | Newman ............... G06F 16/335 707/754 |
| 2015/0317398 A1* | 11/2015 | Phillips ................. H04L 67/306 707/734 |
| 2016/0189545 A1* | 6/2016 | York ...................... G08G 1/065 701/414 |

OTHER PUBLICATIONS

European Patent Office, Search Report and Opinion, European Patent Application No. 15198426. 7, dated May 6, 2016, seven pages.
PCT International Search Report and Opinion, PCT Application No. PCT/US2015/061499, dated Mar. 2, 2016, seventeen pages.

\* cited by examiner

PRESENTING PREVIOUSLY PRESENTED CONTENT ITEMS STORED BY USERS OF A SOCIAL NETWORKING SYSTEM

CROSS-REFERENCE TO RELATED APPLICATION

This application is a continuation of co-pending U.S. application Ser. No. 14/590,290, filed Jan. 6, 2015, which is incorporated by reference in its entirety.

BACKGROUND

This disclosure relates generally to presenting content via a social networking system, and more particularly to presenting a social networking system user with content previously stored by the social networking system user.

Social networking systems maintain and present a large amount of content to their users. For example, a social networking system presents a user with descriptions of actions performed by other social networking system users, with image or video data provided to the social networking system by other users, or with descriptions of events associated with social networking system users. As numbers of social networking system users increase, the amount of content presented to social networking system users also increases, making it difficult for a user of a social networking system to review or interact with the amount of content presented by the social networking system. For example, when a user is presented with content that the user finds interesting, the user be unable interact with the content when it is initially viewed (e.g., viewing a link at work to a video that the user wants to view at home) or may desire to review the content at a more convenient time. However, because conventional social networking systems provide a user with new content as the content is received, the user may have difficulty accessing a content item after it was initially presented.

While certain social networking systems allow a user to store a content item presented to the user and subsequently retrieve the stored content item, these social networking system often require a user to manually retrieve the saved content. However, content items stored by a user may be relevant to the user at times when it is impractical for the user to manually retrieve the stored content items. For example, if a user stores an advertisement including a coupon having an expiration date the user plans to use on a purchase, the stored advertisement is more relevant to the user before the expiration date has passed. Hence, presenting stored content items to a user in response to a user requesting the stored content items may prevent the user from viewing a stored content item when it is relevant to the user.

SUMMARY

A social networking system allows a user to store content items presented to the user by the social networking system (e.g., posts, advertisements, groups, games, messages, and other types of content) and subsequently access the stored content items. To allow the user to more easily access the stored content items associated with the user, the social networking system may present a stored content item associated with the user to the user when attributes associated with the user satisfying one or more criteria associated with the stored content item. This allows the social networking system to present a stored content item to a user when the stored content item is more likely to be relevant to the user. For example, the social networking system presents a stored content item to the user when the user is within a threshold distance of a location associated with the stored content item or when a connection between a client device of the user and the social networking system has a specified type.

In one embodiment, the social networking system associates one or more rules with a stored content item associated with a user that specify conditions that, when satisfied, cause presentation of the stored content item to the user. For example, a rule identifies an event or a type of event (e.g., an opening of a store, a release of a movie, etc.) associated with a stored content item. A rule associated with a stored content item may specify any suitable criteria causing presentation of the stored content item when satisfied. Example criteria for presenting a stored content item include: a geographic location associated with a content item, an action performed by a user (e.g., posting content, sharing content, indicating a preference for content, refreshing a feed of content, establishing a connection with an additional user, etc.), a type of connection between a client device associated with a user and the social networking system, a type of client device (e.g., mobile device, desktop device, etc.) used to access the social networking system, and one or more characteristics of a connection between a client device associated with the user and the social networking system (e.g., bandwidth).

A rule associated with a stored content item may also specify a format in which the stored content item is presented when criteria associated with the rule are satisfied. For example, a rule indicates that a content item is presented as a story in a news feed of content items presented to a user, as a message, as a text message, or in any other suitable format. Additionally, a rule may specify additional content presented with a stored content item when the stored content item is presented. For example, a rule indicates that information describing satisfied conditions causing presentation of a stored content item is presented in conjunction with the stored content item. Rules may be customized by different social networking system users or may be specified based on default settings maintained by the social networking system. For example, if a user stores an advertisement for a concert, the social networking system may associate the advertisement with a rule that presents the advertisement as a message to a user on a date when tickets for the concert are available for purchase; however, the user may modify the criteria to be satisfied for the stored advertisement to be presented.

When information associated with a user by the social networking system satisfies criteria specified by a rule associated with a stored content item, the social networking system includes the stored content item in a selection process used by the social networking system to select content for presentation to the user. For example, the social networking system associates a rule with a stored advertisement for a department store specifying a threshold distance from a department store location, so the stored advertisement is included in a selection process when a location associated with the user is within the threshold distance of a department store location for at least a threshold amount of time. In one embodiment, the selection process determines a measure of relevance of the stored content item to the user, determines measures of relevance of additional content items to the user, and selects content from the additional content items and the stored content item for presentation based on the measures of relevance. For example, the social networking system ranks stored content items and additional content items based on their measures of relevance and selects content for presentation based on the ranking. Additional information may also be used when selecting content from the additional content items and the stored content items for presentation. For example, a type of client device used to present the content or a type of connection between the client device and the social networking system may modify selection of content for presentation.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
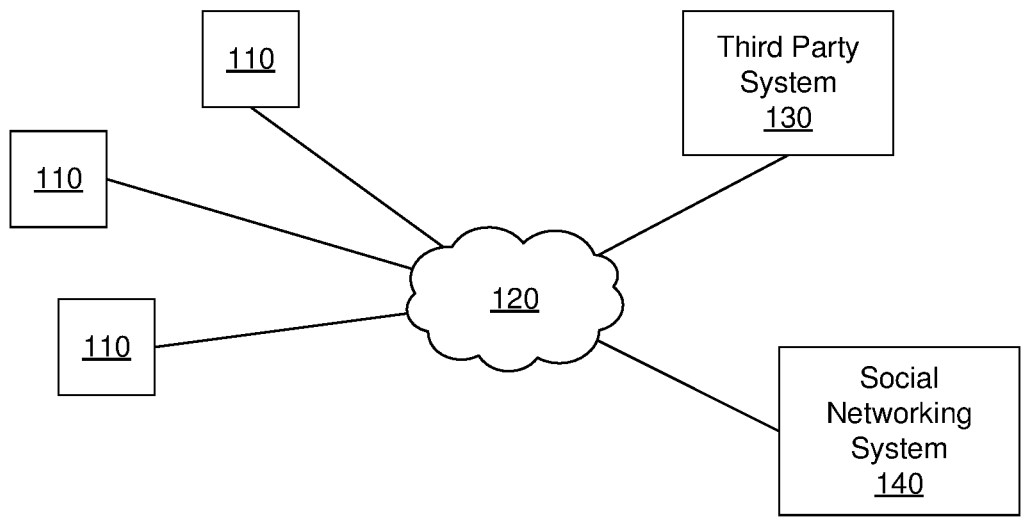
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
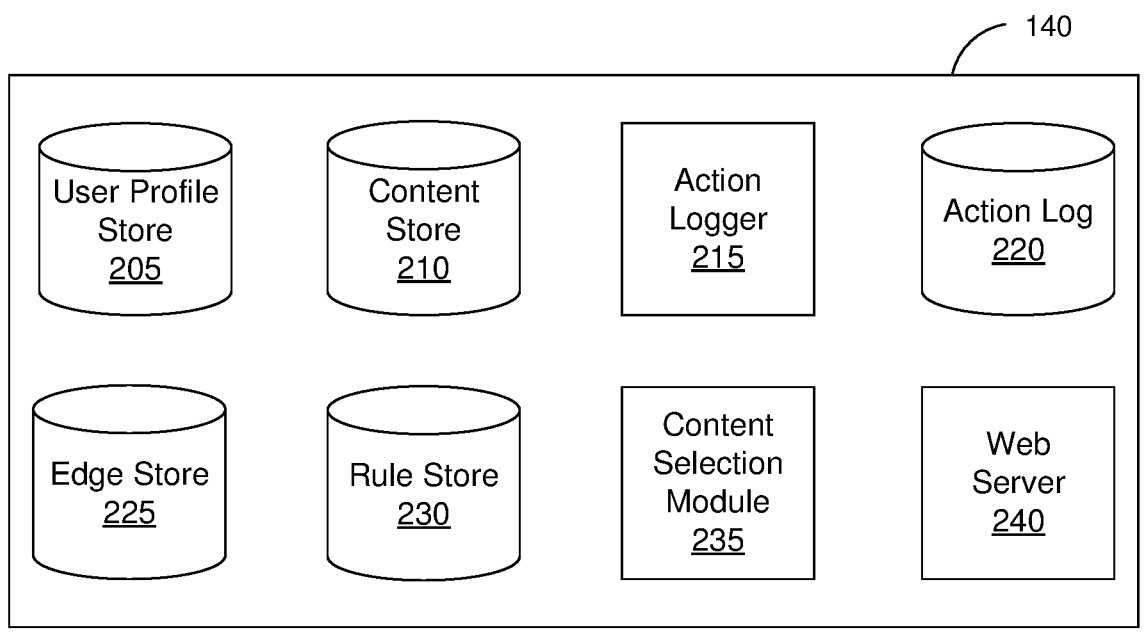
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a rule store 230, a content selection module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

In some embodiments, a user profile associated with a user includes content items presented to the user and stored by the user. For example, the user profile includes identifiers associated with content items the user has stored. Information describing a stored content item may also be included in the user profile along with an identifier associated with the stored content item. Examples of types of information associated with a stored content item include a type of the stored content item, a location associated with the stored content item, a time when the stored content item was stored by the user. Additionally, one or more rules from the rule store 230, further described below, are associated with a stored content item. For example, identifiers associated with one or more rules are associated with a content item identifier of a stored content item and included in a user profile of the user associated with the stored content item. Additionally, one or more privacy settings may be associated with a stored content item by a user to regulate access of other social networking system users to the stored content item; the privacy settings may be associated with the content identifier of the stored content item. A user may retrieve one or more stored content items associated with the user by interacting with the user's user profile. Stored content items may be organized and presented by type, by chronological order, or by any other suitable organizational method. Storage of content items by social networking system users is further described in U.S. patent application Ser. No. 13/747, 714, filed on Jan. 23, 2013, and U.S. patent application Ser. No. 13/316,374, filed on Dec. 9, 2011, each of which is hereby incorporated by reference in its entirety.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140. In one embodiment, the content store 210 includes one or more user identifiers that identify one or more social networking system users presented with a content item that are stored in association with the stored content item.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, in a topic, or in another user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The rule store 230 includes one or more rules specifying criteria that, when satisfied, cause presentation of a stored content item to a user associated with the stored content item. Example criteria specified by a rule for presenting a stored content item include: a location associated with the user being within a threshold distance of a geographic location associated with the content item (e.g., a retail location specified in the content item, a location of an event specified by the content item), a geographic location associated with a user, a threshold duration a user is associated with a specified location, a threshold time difference between a current time and a time associated with a content item (e.g., a time associated with an event included in the content item), an action performed by a user (e.g., posting content, sharing content, indicating a preference for content, commenting on content, establishing a connection with another user or with an object), a type of connection between the user and another user (e.g., a user associated with the content item), a characteristic of a client device 110 used to access the social networking system 140 (e.g., mobile device, desktop device, operating system), a characteristic of a connection between a client device 110 associated with the user and the social networking system 140 (e.g., available bandwidth, networking protocol used for the connection). However, criteria specified by a rule may be any information suitable for comparison to one or more attributes associated with a user.

Additionally, a rule included in the rule store 230 may include information describing a format in which a stored content item associated with the rule is presented when criteria specified by the rule are satisfied by attributes associated with a user. For example, a rule associated with a stored content item indicates that the content item is presented to a user via a text message or via a story included in a news feed of content items presented to the user. Additionally, a format included in a rule may specify a position in a display relative to other items in which a stored content item associated with the rule is presented, a duration during which a stored content item associated with the rule is presented, or any other suitable information identifying presentation of a stored content item associated with the rule. A rule may also specify additional content presented in conjunction with a stored content item. Examples of additional content presented in conjunction with a stored content item include: an identification of criteria satisfied by attributes of the user causing presentation of the stored content item or other information providing a reason for presentation of the stored content item, additional information associated with the stored content item (e.g., directions to a location associated with the stored content item), and one or more options for managing the stored content item (e.g., delete the stored content item, modify rules associated with the stored content item, etc.). For example, an advertisement for sunglasses that a user has stored is presented to the user when the user is within a quarter-mile of a location associated with a retailer selling the sunglasses is presented along with a map identifying the location associated with the retailer. A user associated with a stored content item may modify the rules associated with a content item. For example, the user may modify the additional information presented in conjunction with the stored content item or modify the format in which the stored content item is presented.

The social networking system 140 may maintain one or more default settings identifying rules associated with stored content items. In various embodiments, the default settings associate different rules with content items based on characteristics of a content item. For example, default settings associate one or more rules with a stored content item based on information included in the stored content item. As an example, if a stored content item includes a location, the default settings associate a rule with the stored content item specifying a threshold distance from the location in the stored content item. In another example, if a stored content item is associated with an event, the default settings associate a rule with the stored content item specifying a threshold time difference between a current time and a time associated with the content item and a rule specifying a threshold distance from a location associated with the content item. However, a user may modify one or more rules associated with a stored content item based on the default settings to modify the criteria to be satisfied for presentation of the stored content item or to modify a format in which the stored content item is presented.

The content selection module 235 selects one or more content items for communication to a client device 110 to be presented to a user based on a selection process. In various embodiments, the content selection module 235 determines a measure of relevance of various content items to the user based on attributes associated with the user (e.g., a client device 110 associated with the user, actions associated with the user, demographic information associated with the user, connections between the user and additional users, etc.) by the social networking system 140 and characteristics associated with various content items (e.g., a format associated with a content item, a date or a time associated with the content item, a geographic location associated with the content item, one or more topics in the content item, actions by additional users with the content item, additional users associated with the content item, etc.). For example, if a user comments on a content item, indicates a preference for the content item, shares the content item, and stores the content item within a time interval from a current time, the content selection module 235 determines that the content item has a higher measure of relevance to the user than an additional content item shared by the user at a time greater than the time interval from the current time. Characteristics of a client device 110 associated with a user may also be used by the content selection module 235 when determining measures of relevance associated with content items. For example, if a content item includes video data, the content selection module 235 determines that a measure of relevance of the content item to a user is greater if a connection between a client device 110 associated with the user and the social networking system 140 has at least a threshold bandwidth than if the connection between the client device 110 and the social networking system 140 has less than the threshold bandwidth.

Based on the measures of relevance, the content selection module 235 applies a selection process to the content items to select content items for presentation to the user. For example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user. As further described below in conjunction with FIG. 3, the selection process used by the content selection module 235 may include content items not presented to the user as well as content items stored by the user. Measures of relevance are determined for the stored content items as well as for the content items not previously presented to the user, and the content selection module 235 selects content from the stored content items as well as from the content items not yet presented to the user based on their associated measures of relevance.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
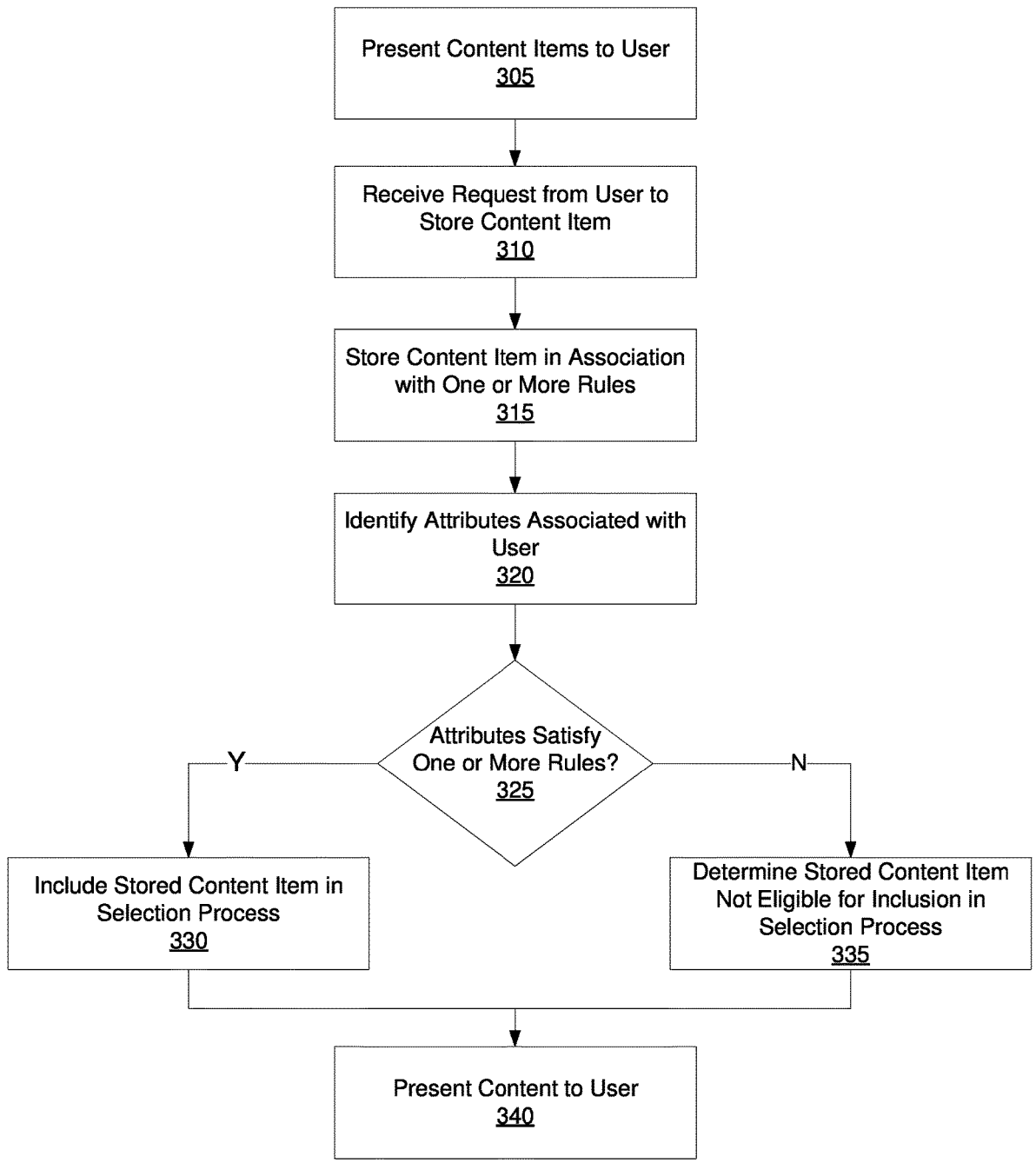
FIG. 3 is a flowchart of a method for presenting a stored content item to a user of a social networking system associated with the stored content item, in accordance with an embodiment.

Presenting a Stored Content Item to a User Associated with the Stored Content Item FIG. 3 is flow chart of one embodiment of a method for presenting a stored content item to a user of a social networking system 140 associated with the stored content item. In other embodiments, the method includes different, additional, or fewer steps than those depicted by FIG. 3. Additionally, in some embodiments, the steps described in conjunction with FIG. 3 may be performed in different orders.

The social networking system 140 presents 305 content items to a user of the social networking system. Content items may be presented 305 to the user in any suitable format. Example formats for presenting 305 content items include: a news feed including multiple content items selected for the user by the social networking system 140, a web page including content items, a notification message identifying one or more content items, a text message including a content item, and an interface presented in conjunction with a news feed. Content items presented 305 by the social networking system 140 include content posted to a page maintained by the social networking system 140, content (e.g., audio, video, or image data) provided to the social networking system 140 by a user of the social networking system 140 (i.e., a status update), a link to retrieve content from a third party system 130, applications, and advertisements. One or more content items are presented 305 in conjunction with an option to store the content items in association with a user profile associated with the user. For example, if a user interacts with a content item, a list of options including an option to store the content item, an option to share the content item, an option to comment on the content item, and an option to indicate a preference for the content item are presented to the user.

The social networking system 140 receives 310 a request from the user to store a content item. For example, the social networking system 140 receives 310 the request when the user selects an option to store a content item presented in conjunction with the content item. The request includes information identifying the user (e.g., a user identifier associated with the user by the social networking system 140) and identifying the content item (e.g., an identifier associated with the content item by the social networking system 140, a network address for retrieving the content item, the content item itself). When the social networking system 140 receives 310 the request, the social networking system 140 stores 315 the content item identified by the request in association with one or more rules specifying criteria that cause presentation of the content item to the user if satisfied by attributes associated with the user. Rules may be associated with the content item based on one or more default settings maintained by the social networking system 140 that associate rules identifying specific criteria with content items based on characteristics of the content item (e.g., a location, a time, a topic, or a user associated with the content item). For example, if the user stores a news feed story about a tourist attraction, the social networking system 140 stores 315 the content item in association with a rule that presents the story to the user when a client device 110 associated with the user is within a threshold distance of the attraction. The user may modify the rules associated with a stored content item. In the previous example, the user may modify the rule associated with the stored content item so the stored content item is presented on a date specified by the user. Alternatively, rules associated with the content item are identified by criteria for presenting the content item included the received request, allowing the user to determine when the content item is retrieved and presented to the user.

Different rules specify different criteria for presenting the content item to the user. As described above, criteria specified by a rule may be based on attributes of the user and/or characteristics of the content item. Example criteria specified by rules include: a location associated with the user being within a threshold distance of a geographic location associated with the content item (e.g., a retail location specified in the content item, a location of an event specified by the content item), a geographic location associated with a user, a threshold duration a user is associated with a specified location, a threshold time difference between a current time and a time associated with a content item (e.g., a time associated with an event included in the content item), an action performed by a user (e.g., posting content, sharing content, indicating a preference for content, commenting on content, establishing a connection with another user or with an object), a type of connection between the user and another user (e.g., a user associated with the content item), a characteristic of a client device 110 used to access the social networking system 140 (e.g., mobile device, desktop device, operating system), a characteristic of a connection between a client device 110 associated with the user and the social networking system 140 (e.g., available bandwidth, networking protocol used for the connection), and a specified date or time. For example, a rule associated with the content item specifies that the content item is presented to the user when the user establishes a connection with an additional user that has indicated a preference for the content item. As an additional example, a rule associated with a content item specifies that the content item is presented to the user when a current time determined from a client device 110 associated with the is within a threshold time period of a time associated with the content item.

In some embodiments, the one or more rules associated with the stored content item describe one or more formats in which the stored content item is presented when criteria specified by a rule are satisfied. For example, a rule includes information specifying whether a content item associated with the rule is presented as a content item in a news feed including multiple content items, is presented as a text message sent to the user, is presented via a notification message sent to the user, or is presented using any other suitable format. Additionally, a rule may identify additional content for presentation in conjunction with the stored content item associated with the rule. For example, a rule may indicate presentation of one or more reasons describing why the stored content item is presented (e.g., satisfied conditions triggering presentation of the content item) along with the content item; the presented reasons may identify the satisfied criteria associated with the rule, identify attributes of the user satisfying the criteria associated with the rule, or include any other suitable information. As another example, a rule may identify one or more commands or options presented in conjunction with the stored content item, such as an option to delete the content item, an option to modify one or more rules associated with the stored content item, an option to share the stored content with other users of the social networking system, or any other suitable options.

The social networking system 140 identifies 320 attributes associated with the user. Examples attributes associated with a user include: a geographic location associated with a client device 110 associated with the user, a time zone associated with the user, a time associated with a user interaction with the social networking system 140, an interaction performed by the user on the social networking system 140, an interaction performed by the user and communicated to the social networking system 140, connections between the user and additional users of the social networking system 140, connections between the user and objects maintained by the social networking system 140, a type of client device 110 associated with the user used to access the social networking system 140, characteristics of a connection between a client device 110 associated with the user and the social networking system 140. Based on the identified attributes, the social networking system 140 determines 325 whether the attributes satisfy criteria specified by one or more rules associated with the stored content item. For example, if a stored advertisement for a retailer is associated with a rule specifying presentation of the advertisement if a location associated with the user is within five miles of a retail location associated with the advertisement for at least ten minutes, the social networking system 140 determines whether a location associated with the user (e.g., a location of a client device 110 associated with the user) is within five miles of a retail location and if the location associated with the user is within five miles of the retail location after ten minutes elapse. If the social networking system 140 determines 325 one or more attributes associated with the user satisfy criteria specified by one or more rules associated with the stored content item, the content item is included 330 in a process of selecting content items for presentation to the user. However, if the one or more attributes associated with the user do not satisfy criteria specified by at least one rule associated with the stored content item, the social networking system 140 determines 335 the stored content item is not eligible for inclusion in the selection process 335.

As described above in conjunction with FIG. 2, the selection process selects content for the user, and the selected content is subsequently presented 340 to the user. In some embodiments, the selection process determines a measure of relevance of each content item that is eligible for inclusion in the selection process to the user and selects content items for presentation to the user based on the measures of relevance. A measure of relevance of a content item to a user may be based on attributes associated with the user (e.g., a client device 110 associated with the user, actions associated with the user, demographic information associated with the user, connections between the user and additional users, etc.) by the social networking system 140 and characteristics associated with various content items (e.g., a format associated with a content item, a date or a time associated with the content item, a geographic location associated with the content item, one or more topics in the content item, action by additional users with the content item, additional users associated with the content item, etc.). For example, a measure of relevance of a stored advertisement including a promotion code for a retailer is higher relative to measures of relevance for other stored content items or for other content items if the user stored several additional content items associated with the retailer or is within a threshold distance of a location associated with the retailer.

Based on the measures of relevance of each content item that is eligible for presentation to the user, the social networking system 140 selects content items for presentation to the user and presents 340 the select content items to the user. For example, the social networking system 140 ranks stored content items and additional content items based on their measures of relevance to the user and selects content items having at least a threshold position the ranking for presentation to the user. If the stored content item is presented 340, it is presented based on a format specified by a rule associated with the stored content item that specified a condition satisfied by the attributes associated with the user. For example, the stored content item is included in a news feed along with additional content items or is presented via a notification message presented to the user.

Additionally, one or more options may be presented in conjunction with the stored content item if it is presented 340. Examples of options presented in conjunction with the stored content item include: an option to view additional stored content items associated with the user, an option to remove the stored content item from the user's user profile, an option to share the stored content item with another user of the social networking system 140, an option to comment on the stored content item, an option to indicate a preference for the stored content item, and an option to view context in which the stored content item was previously presented to the user (e.g., content items presented along with the stored content item when the content item was previously presented to the user). As described above, a rule associated with the stored content item and including criteria satisfied by the attributes associated with the user may identify one or more options presented in conjunction with the stored content item. In some embodiments, A content items are presented 340 to the user in a summarized format along with an option to fully view the stored content item. For example, if a user stores a page post, when the stored page post is presented 340 to the user, a portion of the stored page post is presented 340 (e.g., a title and an image associated with the page as well as an indication that the page post was previously stored by the user) along with an option to view the complete stored page post.

Example Presentation of a Previously Presented Stored Content Item

Figure 4:
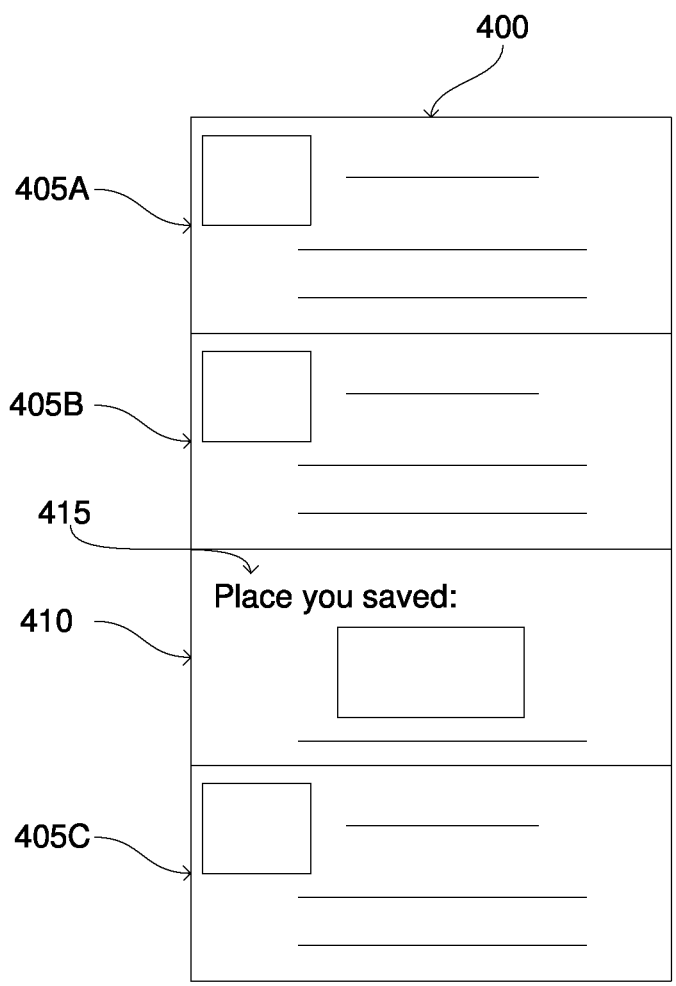
FIG. 4 is an example user interface showing a presentation of a stored content item to a social networking system user, in accordance with an embodiment.

FIG. 4 shows an example of presenting a stored content item 410 in a feed 400 of content items presented to a user. In the example of FIG. 4, the feed 400 includes content items 405A, 405B, 405C, which were not previously presented to the user and stored content item 410, which the user previously stored. Additionally, an indication 415 is presented along with the stored content item 410 to notify the user that the stored content item 410 was previously stored by the user. In some embodiments, the indication 415 may include additional information describing one or more reasons for presentation of stored content item 410 in the feed 400 or information describing stored content item 410. For example, the indication 415 is a caption indicating that the content item 410 is a place that was stored by the user. Example information presented by the indication 415 include: a type of stored content item 410 (e.g., a place, a photograph, an advertisement, a link), a time stored content item 410 was stored, and a context in which stored content item 410 was originally presented (e.g., a page post, an advertisement).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
presenting, at a first time, a content item maintained by an online system to a user of the online system;
receiving, at a second time later relative to the first time, a request from the user for a future presentation of the content item later relative to the first time;
storing the content item in association with the user with one or more rules specifying criteria to be satisfied for the content item to be eligible for the future presentation to the user later relative to the first time;
identifying, at a third time later relative to the second time, a condition associated with the user satisfying the criteria specified by the one or more rules associated with the content item;
identifying the content item as eligible for presentation to the user at the third time later relative to the second time in response to identifying the condition associated with the user satisfying the criteria satisfied by the one or more rules associated with the content item;

responsive to identifying an opportunity to present a content item to the user at the third time later relative to the second time,
including the content item in a selection process with other content items maintained by the online system, wherein the selection process selects a content item for presentation to the user at the third time based on a measure of relevance for the content item and each of the plurality of other content items; and
responsive to the content item being selected in the selection process at the third time, presenting content of the content item at the third time to the user.

2. The method of claim 1, wherein presenting the content of the content item at the third time to the user comprises:
determining a format for presenting the content of the content item at the third time; and
presenting the content item to the user at the third time to the user in the determined format.

3. The method of claim 1, wherein presenting the content of the content item at the third time to the user comprises:
presenting the content item along with information describing the condition associated with the user satisfying the criteria specified by the one or more rules associated with the content item.

4. The method of claim 1, wherein identifying the content item as eligible for presentation to the user at the third time later relative to the second time in response to identifying the condition associated with the user satisfying the criteria satisfied by the one or more rules associated with the content item comprises:
determining the content item is eligible for presentation to the user if a current time associated with the user accessing the social networking system satisfies the condition associated with the user satisfying the criteria specified by the one or more rules associated with the content item.

5. The method of claim 1, wherein identifying the content item as eligible for presentation to the user at the third time later relative to the second time in response to identifying the condition associated with the user satisfying the criteria satisfied by the one or more rules associated with the content item comprises:
determining the content item is eligible for presentation to the user if a location associated with the user is within a threshold distance of a location associated with the content item specified by the condition associated with the user satisfying the criteria specified by the one or more rules associated with the content item.

6. The method of claim 1, wherein identifying the content item as eligible for presentation to the user at the third time later relative to the second time in response to identifying the condition associated with the user satisfying the criteria satisfied by the one or more rules associated with the content item comprises:
determining the content item is eligible for presentation to the user if the social networking system received a type of interaction from the user associated with the content item specified by the condition associated with the user satisfying the criteria specified by the one or more rules associated with the content item.

7. The method of claim 1, wherein identifying the content item as eligible for presentation to the user at the third time later relative to the second time in response to identifying the condition associated with the user satisfying the criteria satisfied by the one or more rules associated with the content item comprises:
determining the content item is eligible for presentation to the user if a type of connection between a client device associated with the user and the social networking system matches a type of connection between the client device and the social networking system specified by the condition associated with the user satisfying the criteria specified by the one or more rules associated with the content item.

8. The method of claim 1, wherein the request from the user for the future presentation of the content item includes one or more rules specifying criteria to be satisfied for the content item to be eligible for the future presentation to the user.

9. The method of claim 1, wherein the request from the user for the future presentation of the content item includes one or more formats for presenting the content item.

10. The method of claim 1, wherein responsive to the content item being selected in the selection process at the third time, presenting content of the content item at the third time to the user comprises:
ranking the content item and the other content items based on the measures of relevance for the content item and for each of the plurality of other content items; and
selecting, by the selection process, the content item in response to the content item having at least a threshold position in the ranking.

11. A computer program product comprising a non-transitory computer readable storage medium having instructions encoded thereon that, when executed by a processor, cause the processor to:
present, at a first time, a content item maintained by an online system to a user of the online system;
receive, at a second time later relative to the first time a request from the user for a future presentation of the content item later relative to the first time;
store the content item in association with the user with one or more rules specifying criteria to be satisfied for the content item to be eligible for the future presentation to the user later relative to the first time;
identify, at a third time later relative to the second time, a condition associated with the user satisfying the criteria specified by the one or more rules associated with the content item;
identify the content item as eligible for presentation to the user at the third time later relative to the second time in response to identifying the condition associated with the user satisfying the criteria satisfied by the one or more rules associated with the content item;
responsive to identifying an opportunity to present a content item to the user at the third time later relative to the second time,
include the content item in a selection process with other content items maintained by the online system, wherein the selection process selects a content item for presentation to the user at the third time based on a measure of relevance for the content item and each of the plurality of other content items; and
responsive to the content item being selected in the selection process at the third time, presenting content of the content item at the third time to the user.

12. The computer program product of claim 11, wherein present the content of the content item at the third time to the user comprises:
determine a format for presenting the content of the content item at the third time; and
present the content item to the user at the third time to the user in the determined format.

13. The computer program product of claim 11, wherein present the content of the content item at the third time to the user comprises:
- present the content item along with information describing the condition associated with the user satisfying the criteria specified by the one or more rules associated with the content item.

14. The computer program product of claim 11, wherein identify the content item as eligible for presentation to the user at the third time later relative to the second time in response to identifying the condition associated with the user satisfying the criteria satisfied by the one or more rules associated with the content item comprises:
- determine the content item is eligible for presentation to the user if a current time associated with the user accessing the social networking system satisfies the condition associated with the user satisfying the criteria specified by the one or more rules associated with the content item.

15. The computer program product of claim 11, wherein identify the content item as eligible for presentation to the user at the third time later relative to the second time in response to identifying the condition associated with the user satisfying the criteria satisfied by the one or more rules associated with the content item comprises:
- determine the content item is eligible for presentation to the user if a location associated with the user is within a threshold distance of a location associated with the content item specified by the condition associated with the user satisfying the criteria specified by the one or more rules associated with the content item.

16. The computer program product of claim 11, wherein identify the content item as eligible for presentation to the user at the third time later relative to the second time in response to identifying the condition associated with the user satisfying the criteria satisfied by the one or more rules associated with the content item comprises:
- determine the content item is eligible for presentation to the user if the social networking system received a type of interaction from the user associated with the content item specified by the condition associated with the user satisfying the criteria specified by the one or more rules associated with the content item.

17. The computer program product of claim 11, wherein identify the content item as eligible for presentation to the user at the third time later relative to the second time in response to identifying the condition associated with the user satisfying the criteria satisfied by the one or more rules associated with the content item comprises:
- determining the content item is eligible for presentation to the user if a type of connection between a client device associated with the user and the social networking system matches a type of connection between the client device and the social networking system specified by the condition associated with the user satisfying the criteria specified by the one or more rules associated with the content item.

18. The computer program product of claim 11, wherein the request from the user for the future presentation of the content item includes one or more rules specifying criteria to be satisfied for the content item to be eligible for the future presentation to the user.

19. The computer program product of claim 11, wherein the request from the user for the future presentation of the content item includes one or more formats for presenting the content item.

20. The computer program product of claim 11, wherein responsive to the content item being selected in the selection process at the third time, present content of the content item at the third second time to the user comprises:
- rank the content item and the other content items based on the measures of relevance for the content item and for each of the plurality of other content items; and
- select, by the selection process, the content item in response to the content item having at least a threshold position in the ranking.

* * * * *

UNITED STATES PATENT AND TRADEMARK OFFICE
CERTIFICATE OF CORRECTION

PATENT NO. : 10,846,803 B2
APPLICATION NO. : 16/200542
DATED : November 24, 2020
INVENTOR(S) : Djabarov et al.

Page 1 of 1

It is certified that error appears in the above-identified patent and that said Letters Patent is hereby corrected as shown below:

In the Claims

In Column 18, in Claim 20, Line 32, after "third" delete "second".

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*